United States Patent [19]
Need

[11] 3,727,480
[45] Apr. 17, 1973

[54] TIMED INPUT-OUTPUT MOTION TRANSMITTING DEVICE
[75] Inventor: Lester E. Need, Brownsburg, Ind.
[73] Assignee: General Motors Corporation, Detroit, Mich.
[22] Filed: Dec. 8, 1971
[21] Appl. No.: 205,845

[52] U.S. Cl. ................................74/470, 74/865
[51] Int. Cl. .................................................G05g 1/00
[58] Field of Search..............................74/470, 110

[56] References Cited

UNITED STATES PATENTS 2,647,412  8/1953  Warmoes et al.......................74/470
2,688,884  9/1954  Warmoes et al.......................74/470

Primary Examiner—Milton Kaufman
Attorney—W. E. Finken et al.

[57] ABSTRACT

A motion transmitting mechanism having a predetermined delay between input and output motion. Movement of the input is transmitted through a lost motion device, such as a spring, to an input piston. Movement of the input piston causes the displacement of a fluid medium which flows at a controlled rate through a restriction. Movement of the input piston is transmitted to an output piston through a lost motion device. Movement of the output piston causes the displacement of the fluid medium at a controlled rate through the restriction. The output moves simultaneously with the output piston.

3 Claims, 2 Drawing Figures

PATENTED APR 17 1973 3,727,480

INVENTOR.
Lester E. Need
BY
Donald F. Scherer
ATTORNEY

TIMED INPUT-OUTPUT MOTION TRANSMITTING DEVICE

The invention herein described was made in the course of work under a contract or subcontract thereunder with the Department of Defense.

This invention relates to motion devices and more particularly to motion transmitting devices wherein there is a predetermined delay between input motion and output motion.

In many linkage systems it is desirable to provide a predetermined delay between input movement and output movement of a linkage. This is particularly true in the throttle linkage connection between an engine and a transmission wherein the engine is a diesel type or compression ignition engine and the transmission is a hydromechanical type. The object of the throttle connection is to impose an engine torque demand signal on the transmission control. It is desirable to have the torque demand signal follow the actual engine torque output closely. In diesel engines the actual engine torque development lags behind engine throttle movement. It is, therefore, desirable to locate a motion transmitting mechanism having a predetermined delay between input and output motion into the throttle linkage to compensate for the lag time.

The present invention provides a predetermined delay between input and output motion by locating lost motion mechanisms and fluid displacing mechanisms between the input and output members. The input member operates on a piston through a spring so that a force on the input member causes the piston to generate a static pressure in an enclosed fluid medium. The static pressure developed by the force on the piston is relieved by fluid flow through a restriction in a second piston thus permitting the first piston to move. Movement of the first piston imposes a force on the second piston through a spring connection therebetween which force on the second piston generates a static pressure in the fluid medium. The static pressure thus generated is relieved by fluid flow through the restriction in the second piston and permits movement of the second piston. The output member is connected to the second piston and moves therewith. Thus the relative movement of the input and output members is controlled by the spring members and the fluid displacement of the pistons.

It is an object of this invention to provide an improved motion transmitting mechanism having a time delay between input and output motion controlled by lost motion mechanisms and fluid displacement.

It is another object of this invention to provide in an improved motion transmitting mechanism an input member which is drivingly connected through a spring to a fluid displacing member which responds to a force on the input member to displace fluid at a predetermined rate through the control restriction in a second fluid displacing member and simultaneously imposes a spring force on the second fluid displacing member such that the second fluid displacing member will displace fluid at a controlled rate through the restriction after the first fluid displacing member has come to rest.

It is another object of this invention to provide in an improved motion transmitting mechanism, an input member and an output member operatively connected by a plurality of lost motion mechanism and fluid displacing means whereby the lost motion mechanisms of the fluid displacing means cooperate to provide a controlled rate of fluid flow to establish a predetermined time delay by the movement of the input and output members.

These and other objects and advantages of the present invention will be more apparent from the following description and drawings in which.

Figure 1:
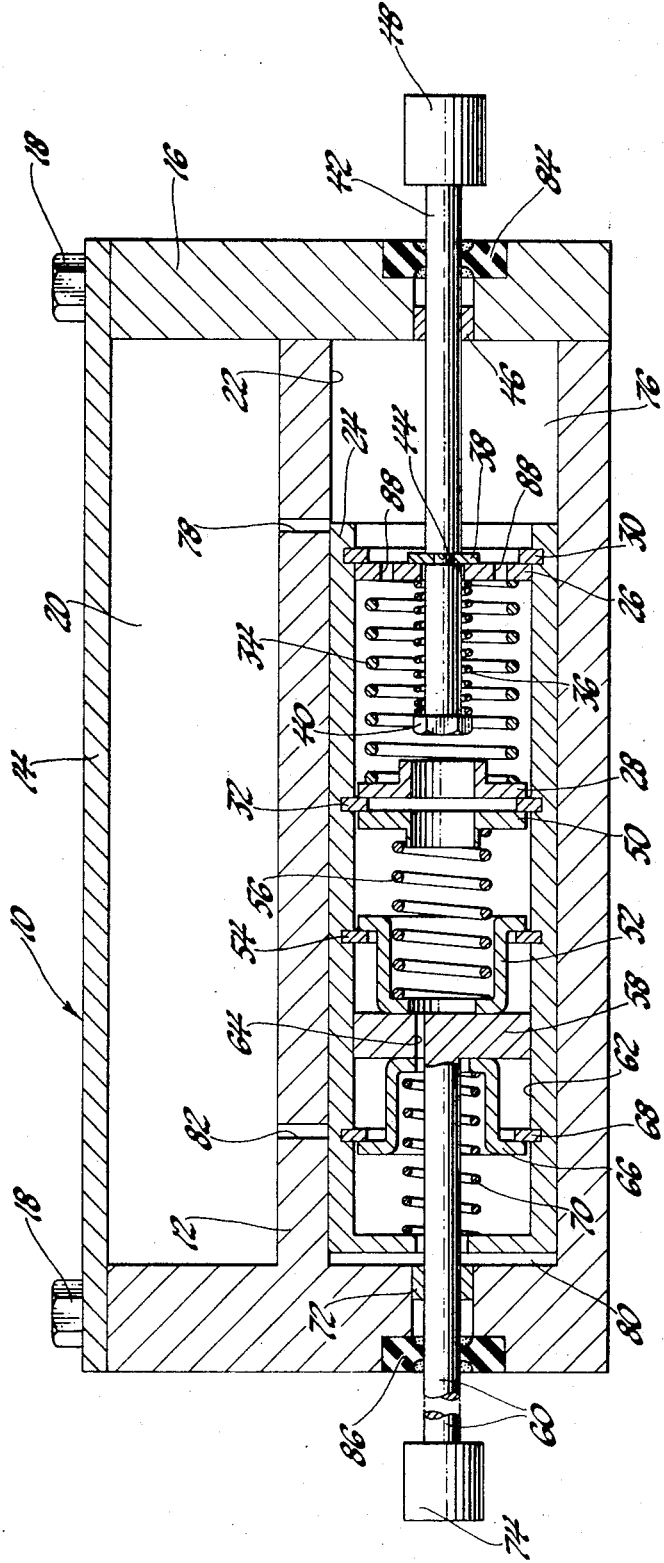
FIG. 1 is a cross-sectional elevational view of the invention.

Referring to the drawings there is shown in FIG. 1 a housing generally designated 10 having a body portion 12, a cover 14 and an end cap 16. The cover 14 is secured by a plurality of threaded fasteners 18 to the body 12 and the end cap 16 which is bonded to or otherwise secured to the body 12. The body 12, cover 14 and end cap 16 cooperate to form a reservoir 20.

The body 12 has a bore 22 which is closed at one end by the cap 16. A cup shaped piston 24 is slidably disposed in the bore 22. A pair of spring seats 26 and 28 are located in the piston 24 by a pair of snap rings 30 and 32 respectively which spring seats have compressed therebetween a spring 34. Another spring 36 also abuts the spring seat 26 and is held in compression by a snap ring 38 which abuts the spring seat 26 and an expanded head 40 formed on an input rod 42. The input rod 42 has a groove 44 which locates the snap ring 38. The input rod 42 is slidably disposed in a bushing 46 located in the end cap 16 and has an end portion 48 secured thereto.

The snap ring 32 also locates a spring seat 50 which cooperates with another spring seat 52 located in the piston 24 by a snap ring 54. The spring seats 50 and 52 cooperate to maintain a compression spring 56 in compression therebetween. The spring seat 52 abuts a piston 58 formed on one end of an output rod 60. The piston 58 is slidably disposed in a bore 62 formed in the piston 24 and has a flow restriction 64 therein which permits controlled fluid flow from one end of bore 22 to the other. Also abutting the piston 58 is another spring seat 66 which is located in the piston 24 by a snap ring 68. A compression spring 70 is held in compression between the spring seat 66 and the end of piston 24. The output rod 60 is slidably disposed in a bushing 72 located in the body 12 and has secured thereto an end portion 74 opposite the piston 58.

In the position shown a fluid cavity 76 is formed in the bore 22 between the piston 24 and the end cap 16 and is in fluid communication with the reservoir 20 through a passage 78. When the piston 24 abuts or is closely adjacent to the end cap 16 a chamber 80 formed in the bore 22 between the piston 24 and the body 12 is in fluid communication with the reservoir 20 through a passage 82. Fluid flow from the chambers 76 and 80 past the input rod 42 and output rod 60 is prevented by seals 84 and 86 respectively which are located in the end cap 16 and body 12 respectively.

During operation the input rod 42 is moved to the right thereby compressing the spring 36 between the spring seat 26 and the expanded head 40 of the input rod 42. This force in the spring 36 is transmitted to the piston 24 through the snap ring 30 so that the piston 24 acts on the fluid medium in the chamber 76 to create a static pressure therein. The static pressure in the chamber 76 is relieved by fluid flow through a plurality of openings 88 in the spring seat 26 and through the control restriction 64. Fluid flow through the restriction 64 occurs at a controlled rate thus controlling the movement of the piston 24. As the piston 24 moves to the right the spring 70 is compressed between the end of piston 24 and the spring seat 66 which transmits a force to the piston 58. Also as the piston 24 moves the passage 78 is closed. The force in spring 70 is less than the force in spring 36 and is therefore not sufficient to overcome the pressure generated in chamber 76 while the piston 24 is moving since the pressure in chamber 76 is proportional to the force in the spring 36. The piston 24 will however reach a stabilized position wherein the spring 36 is trapped in compression between the expanded head 40 and the snap ring 38 and, therefore, no longer imposes a force on the piston 24. At this time the piston 58 will be moved by the force in spring 70. However, the movement of piston 58 must result in the displacement of fluid from one side of the piston 58 to the other, therefore, the restriction 64 again controls fluid flow and the time rate at which the piston 58 moves. Since the output rod 60 is secured to the piston 58 the output rod moves at the same time as the piston 58 does. Assuming that the mechanism has been moved from the position shown either to a position with the piston 24 adjacent the end cap 16 or to an intermediate position, the input rod 42 can then be moved to the left. Movement of the input rod in this direction will cause the spring 34 to be further compressed between the spring seats 26 and 28 thus transmitting a spring force to the piston 24 through the spring seat 28 and snap ring 32. This force will result in a static pressure in chamber 80 which pressure is relieved by fluid flow at a control rate through the restriction 64 thus permitting movement of the piston 24. Movement of the piston 24 causes the spring 56 to be further compressed between the spring seats 50 and 52 thus imposing a force on the output piston 58. The force in spring 34 is greater than the force in spring 36, therefore, the static pressure acting on the left side of piston 58 will prevent movement thereof since the static pressure is proportional to the force in spring 34. The piston 24 will, however, move to a point of stability wherein the spring 34 reaches its trapped position shown at which time the spring 56 will begin movement of the piston 58 which will result in controlled flow of fluid through the restriction 64 to control the movement of the output rod 60.

Figure 2:
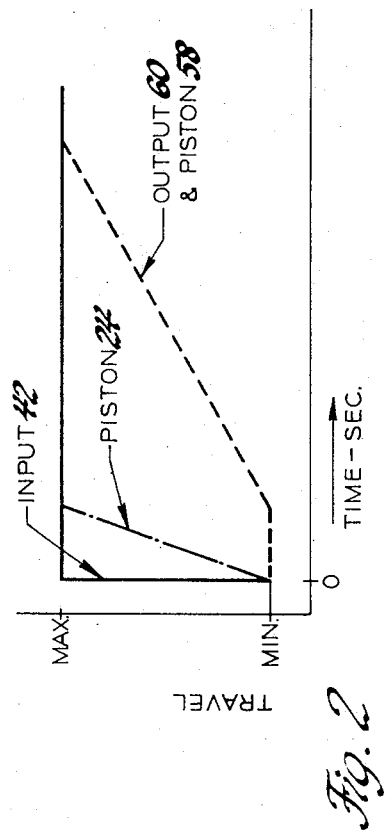
FIG. 2 is a graph showing the time relationship between input and output movement.

From the above description it is obvious that the movement of the output member lags behind the movement of the input member at a predetermined rate. This time delay is shown graphically in FIG. 2 which shows that the input 42 is moved from a minimum position to a maximum position or from intermediate position. Movement of the input member 42 is followed by movement of the piston 24 at a time rate controlled by fluid flow through the restriction 64. When the piston 24 has reached a point of stability the output 60 and piston 58 will move at a controlled rate again determined by fluid flow through the restriction 64.

Obviously, many modifications and variations of the present invention are possible in light of the above teachings. It is, therefore, to be understood that within the scope of the appended claims the invention may be practiced otherwise than as specifically described.

What is claimed is:

1. A motion transmitting mechanism comprising, a movable input member; a movable output member; first fluid displacing means; spring means between said input member and said first fluid displacing means for permitting lost motion therebetween; second fluid displacing means secured to said output member and having restriction means therein; and second spring means for permitting lost motion between said first and second fluid displacing means; said restriction means initially providing a time control for the fluid displaced by said first fluid displacing means and secondly providing a time control for the fluid displaced by said second fluid displacing means and cooperating with said first and second spring means to provide a time delay between movement of said input and output members.

2. A motion transmitting mechanism comprising, a movable input member; a movable output member; first fluid displacing piston means; spring means between said input member and said first fluid displacing piston means for permitting lost motion and for transmitting a force therebetween; second fluid displacing piston means secured to said output member and having restriction means therein; and second spring means for permitting lost motion and for transmitting a force between said first and second fluid displacing means; said restriction means initially providing a time control for the fluid displaced by said first fluid displacing piston means and secondly providing a time control for the fluid displaced by said second fluid displacing piston means and cooperating with said first and second spring means to provide a time delay between movement of said input and output members.

3. A motion transmitting mechanism comprising, an input member; an output member; housing means having a bore therein; first piston means slidably disposed in said bore; first spring means operatively connected between said input member and said first piston means for transmitting forces while permitting relative movement therebetween; second piston means secured to said output member and being slidably disposed in said first piston means; second spring means operatively connected between said first and second piston means for transmitting forces therebetween; a fluid filling said bore and said first piston means; and restriction means in said second piston means for initially controlling fluid flow in response to a force transmitted from said input member to said first piston means, and secondly controlling fluid flow in response to a force transmitted from said first piston means to said second piston means.

* * * * *